United States Patent
Dassa et al.

(10) Patent No.: US 9,792,373 B2
(45) Date of Patent: Oct. 17, 2017

(54) SYSTEMS AND METHODS TO DETERMINE TRENDING TOPICS FOR A USER BASED ON SOCIAL GRAPH DATA

(71) Applicant: Facebook, Inc., Menlo Park, CA (US)

(72) Inventors: Guy Dassa, Mamaroneck, NY (US); Louis Paul Kruger, Brooklyn, NY (US)

(73) Assignee: Facebook, Inc., Menlo Park, CA (US)

(*) Notice: Subject to any disclaimer, the term of this patent is extended or adjusted under 35 U.S.C. 154(b) by 361 days.

(21) Appl. No.: 14/587,575

(22) Filed: Dec. 31, 2014

(65) Prior Publication Data

US 2016/0188704 A1 Jun. 30, 2016

(51) Int. Cl.
*G06F 17/30* (2006.01)
*G06Q 50/10* (2012.01)

(52) U.S. Cl.
CPC .. *G06F 17/30867* (2013.01); *G06F 17/30958* (2013.01); *G06Q 50/10* (2013.01)

(58) Field of Classification Search
None
See application file for complete search history.

(56) References Cited

U.S. PATENT DOCUMENTS

| | | | | |
|---|---|---|---|---|
| 8,930,384 B2* | 1/2015 | Sommer | ........... | G06F 17/30979 707/722 |
| 8,949,239 B2* | 2/2015 | Ruffner | ............ | G06F 17/30867 707/738 |
| 9,276,974 B2* | 3/2016 | Sommer | ........... | G06F 17/30864 |
| 9,483,580 B2* | 11/2016 | Franceschini | ..... | G06F 17/30958 |
| 2012/0066073 A1* | 3/2012 | Dilip | .................. | G06Q 30/0269 705/14.66 |
| 2015/0134655 A1* | 5/2015 | Gamaley | ................ | G06Q 50/01 707/734 |
| 2015/0161633 A1* | 6/2015 | Adams | ................... | G06Q 50/01 705/7.33 |
| 2017/0039278 A1* | 2/2017 | Marra | ............... | G06F 17/30861 |

* cited by examiner

*Primary Examiner* — Debbie Le
(74) *Attorney, Agent, or Firm* — Sheppard Mullin Richter & Hampton LLP

(57) ABSTRACT

Systems, methods, and non-transitory computer readable media configured to determine a degree of separation between a user and a connection within a social network of the user, the connection associated with an interaction from which at least topic is determined. A value of affinity between the user and the connection is determined. A weight reflecting a value of interest similarity between the user and the connection is determined. A term based on the degree of separation, the value of affinity, and the weight reflecting a value of interest similarity is calculated. Terms associated with the at least one topic are combined to generate a composite score associated with the at least one topic to determine whether to present the at least one topic to the user.

20 Claims, 8 Drawing Sheets

SYSTEMS AND METHODS TO DETERMINE TRENDING TOPICS FOR A USER BASED ON SOCIAL GRAPH DATA

FIELD OF THE INVENTION

The present technology relates to the field of content provision. More particularly, the present technology relates to techniques for determining topics of interest for a user based on connections of the user.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, the publication of content items can reflect many shortcomings of a social network. For example, when the social network has a large number of users, a large number of postings may be generated. In view of their number, postings can be difficult to organize and publish in a manner that optimizes their audience. In some instances, a posting may be published in a way that does not allow certain users of the social network who would find the posting most interesting to locate the posting. In other instances, a posting that is not relevant to certain users of the social network can be nonetheless presented to those users. In yet other instances, many postings may be published together with no apparent unifying theme or discernible combined relevance to their audience.

In particular, the social network of a user may engage in content related activities in a manner that is distinct from the interactions of all of the members of the social network as a whole. Interactions of the social network of the user may have particular relevance to the user to a larger extent than the interactions of the social network as a whole. However, because of the sheer volume of available content on large social networks, discovery of and focus on the interactions of the social network of the user may prove elusive for the user.

SUMMARY

Various embodiments of the present disclosure can include systems, methods, and non-transitory computer readable media configured to determine a degree of separation between a user and a connection within a social network of the user, the connection associated with an interaction from which at least one topic is determined. A value of affinity between the user and the connection is determined. A weight reflecting a value of interest similarity between the user and the connection is determined. A term based on the degree of separation, the value of affinity, and the weight reflecting a value of interest similarity is calculated. Terms associated with the at least one topic are combined to generate a composite score associated with the at least one topic to determine whether to present the at least one topic to the user.

In an embodiment, a value of authority of the connection is determined, wherein the term is further based on the value of authority.

In an embodiment, the weight reflecting a value of interest similarity between the user and the connection is based on similarity of recently interacted topics and categories at different levels of granularity.

In an embodiment, a posting of content associated with the interaction is analyzed to determine the at least one topic.

In an embodiment, the connection is within a threshold value of a number of degrees of separation from the user.

In an embodiment, the interaction is within a threshold value of a number of interactions of connections from which topics can be determined.

In an embodiment, a time associated with the interaction is within a threshold value of a historical time period over which to determine topics.

In an embodiment, composite scores associated with topics are sorted. The topics are ranked according to the composite scores to identify a cluster of the topics.

In an embodiment, the cluster of the topics are compared with other topics identified as trending.

In an embodiment, at least one of the cluster of the topics is provided for presentation to the user.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
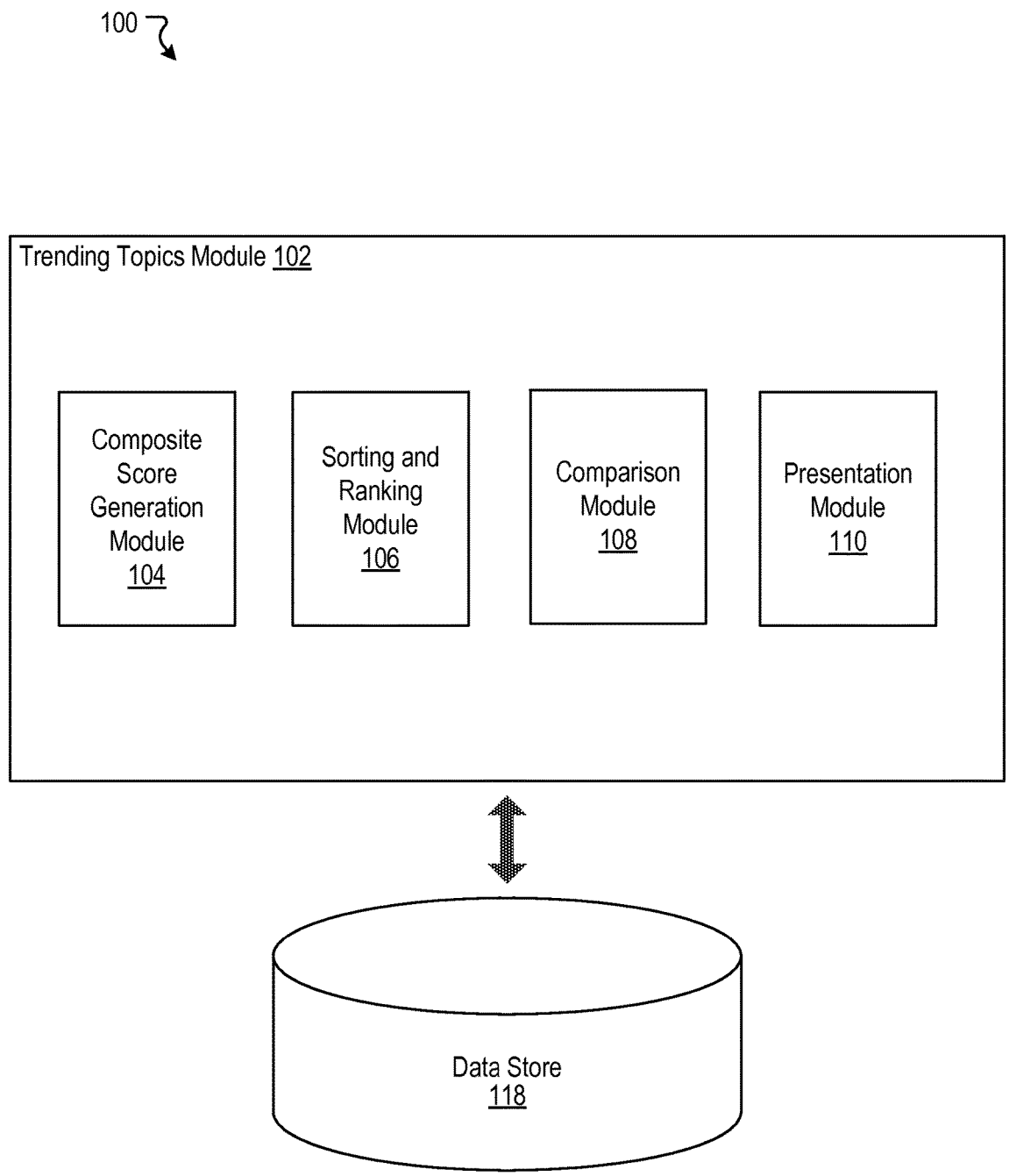
FIG. 1 illustrates an example trending topics module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Determining Trending Topics for a User

People use computing devices (or systems) for a wide variety of purposes. Computing devices can provide different kinds of functionality. Users can utilize their computing devices to produce information, access information, and share information. In some cases, users can use their computing devices to generate and publish content postings. Content items can include any combination of content types, such as text, images, videos, and audio. The content items can be shared for consumption by others through a social networking system. The content items can be shared in a variety of formats, such as posts to the social networking system.

The conventional publication of content items can entail many disadvantages. The disadvantages can be more pronounced as the size of the social networking system and the number of content items grows. In some instances, a large number of content items is often published and presented to a user without any apparent relationship to the interests of the user. This lack of apparent relationship can engender confusion or frustration on the part of users or otherwise detract from usability of the social networking system. A social networking system can identify content items or related topics as having current, heightened relevance based on their popularity with the members of the social networking system in general. However, even when they are identified, there is little assurance that those content items and related topics will be consistent with the unique interests of a particular user or reflect the activity of connections with whom she is most closely connected or in which she may have most interest.

An improved approach to the identification of trending topics for a user overcomes the foregoing and other disadvantages associated with conventional approaches. The present disclosure can increase the discoverability of topics that are trending among people of common interests and social proximity. The present disclosure can generate a composite score relating to a particular topic about which connections of the user have expressed interest. The composite score can be based on various factors such as the degree of relatedness of a connection with the user, the affinity shared between the user and the connection, the interest similarity that the user and the connection share with respect to a category including the topic, and the authority level of the connection. The composite score for a topic can reflect an aggregation of all connections of the user who have expressed interest in the topic. A composite score can be generated for every topic about which the connections of the user have expressed interest. In this regard, as discussed in more detail herein, values for all instances of interest in a topic as expressed by a plurality of connections can be aggregated to produce a composite score in relation to the topic. The composite scores for the various topics can be sorted and ranked. Topics corresponding to a threshold number of the highest composite scores can be selected for potential presentation to the user as trending topics targeted for the user. The selected topics can be compared with other trending topics identified by other techniques so that their presentation is appropriately managed.

FIG. 1 illustrates an example system 100 including an example trending topics module 102 configured to identify topics that are trending within a relevant scope of a social network of a user, according to an embodiment of the present disclosure. A topic can include, for example, any theme, interest, event, or other subject. A trending topic (e.g., micro trend) can include any topic that is current (or not obsolete or not untimely) and popular within a relevant community of entities. In relation to a user of a social networking system, a trending topic can include a topic about which one or more connections within a relevant scope of a social network of the user has expressed interest.

The trending topics module 102 can include a composite score generation module 104, a sorting and ranking module 106, a comparison module 108, and a presentation module 110. The example system 100 can also include at least one data store 118. The components (e.g., modules, elements, etc.) shown in this figure and all figures herein are exemplary only, and other implementations may include additional, fewer, integrated, or different components. Some components may not be shown so as not to obscure relevant details.

In some embodiments, the trending topics module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the trending topics module 102 can be implemented, in part or in whole, as software running on one or more computing devices or systems, such as on a server or user or client computing device. For example, the trending topics module 102 can be implemented as or within an application (e.g., app), a program, or an applet, etc., running on a user computing device or client computing system. In some instances, the trending topics module 102 can, in part or in whole, be implemented within or configured to operate in conjunction with a social networking system (or service), such as the social networking system 630 of FIG. 6. It should be understood that many variations are possible.

The composite score generation module 104 can be configured to generate composite scores for topics. The topics can reflect interests of certain connections of a user. The topics can be identified from interactions of the connections on a social networking system. For each topic, a composite score can be determined. The composite score can be based on one or more of the degree of separation (relatedness) of a connection of the user, the affinity shared between the user and the connection, a weight reflecting a value of interest similarity between the user and the connection based on similarity of recently interacted topics and categories at different levels of granularity (or a category to which the topic belongs), and the authority level of the connection. The composite score generation module 104 is discussed in more detail herein.

The sorting and ranking module 106 can identify trending topics based on the composite scores for the topics. The topics can be sorted by their composite scores. When composite scores having relatively higher values indicate relatively higher levels of potential relevance for the user, the composite scores can be sorted in descending order. The sorted topics can be ranked according to their descending order. For example, a threshold number of the topics associated with the highest composite scores can be selected for potential presentation to the user as trending topics. As another example, a threshold value of a composite score can be determined, and all topics having composite scores equal to or greater than the threshold value can be selected for potential presentation to the user as trending topics. A cluster (or subset) of topics accordingly can be identified for potential presentation for the user.

The comparison module 108 can compare the selected trending topics identified by the sorting and ranking module 106 with other information. For example, trending topics may be identified by techniques other than the techniques associated with the trending topics module 102. The other techniques can be based on other data, constraints, considerations, and factors. In one instance, the other trending topics can be identified based on the topics in which all members of an entire social networking system as a whole have expressed interest. In another instance, the other trending topics can be identified based on the topics in which large numbers of members (e.g., all members in a large geographic region, all members in a large demographic, etc.) of a social networking system have expressed interest. When one or more of the trending topics identified by the sorting and ranking module 106 are the same as one or more of the other trending topics, potential presentation of the one or more of the trending topics identified by the sorting and ranking module 106 can be selectively managed. In some instances, a trending topic can be presented with relatively more prominence or emphasis if it has been identified by more than one technique. In some instances, a trending topic that has been identified by more than one technique can be managed so that its presentation to the user is not duplicative.

As another example, the comparison module 108 can monitor previous interaction by the user with trending topics presented to the user. One or more trending topics identified by the sorting and ranking module 106 may have been presented to the user one or more times within a recent time interval. The comparison module 108 can track the trending topics in which the user previously expressed interest and the trending topics in which the user did not previously express interest. The comparison module 108 can compare newly identified trending topics with trending topics previously presented to the user. If a newly identified trending topic is the same as a trending topic already presented to the user in which the user did not previously express interest, potential presentation of the newly identified trending topic can be selectively managed.

The presentation module 110 can manage the potential presentation of trending topics (or related cluster) to a user. The trending topics for potential presentation to the user can include the trending topics identified by the sorting and ranking module 106. The potential presentation of trending topics can be performed in a variety of manners. For example, the trending topics selected for presentation can be displayed in any preexisting or dedicated region of one or more screens or pages supported by the social networking system. Further, the trending topics can be presented in order of their composite scores. As another example, when one or more of the trending topics identified by the sorting and ranking module 106 are the same as one or more trending topics identified by another technique, the trending topic can be presented with relatively more prominence or emphasis. Further, the presentation module 110 can remove from consideration a trending topic that has been identified by more than one technique so that its presentation to the user is not duplicative. As yet another example, if a newly identified trending topic is the same as a trending topic already presented to the user in which the user did not previously express interest, the presentation module 110 can manage the trending topic so that it is not further presented to the user. As yet still another example, if a composite score of a trending topic or related cluster is low in comparison to other trending topics or related clusters identified using other techniques, the trending topic or related cluster may not be presented to the user.

The data store 118 can be configured to store and maintain various types of data, such as the data relating to the determination of trending topics. For example, the data store 118 can store data relating to interactions of certain connections of the user, data from which to determine tags from such interactions, mapping between topics and categories, the interest similarity that the user and the connection share with respect to a category including a particular topic, the authority level of a connection, etc. The data can reflect any suitable historical time period, including for example, one week, 30 days, 60 days, six months, a year, five years, etc.

The data store 118 can also maintain other information associated with the social networking system. The information associated with the social networking system can include data about users, social connections, social interactions, locations, geo-fenced areas, maps, places, events, groups, posts, communications, content, account settings, privacy settings, a social graph, and various other types of data. In some implementations, the data store 118 can store information associated with users, such as user identifiers, user information, user specified settings, content produced by users, user interactions, and various other types of user data. As shown in the example system 100, the trending topics module 102 can be configured to communicate and/or operate with the data store 118.

Various alternative embodiments can be used. For example, the trending topics module 102 need not include a composite score generation module 104. The trending topics module 102 instead can create a histogram of trending topics within a relevant scope of the social network of the user. The trending topics can be sorted by their values of occurrence. A threshold number of the trending topics with the highest values of occurrence or the trending topics associated with values above a threshold value of occurrence can be provided to the comparison module 108, as discussed herein. As another example, a weight reflecting a value of interest similarity between the user and the connection based on similarity of recently interacted topics and categories at different levels of granularity (or the category to which the topic belongs) need not be used to determine the composite score. Rather, a weight reflecting a value of interest similarity between the user and the connection that is agnostic as to category (and topic) can be used. As yet another example, a value of interest similarity between the user and a connection can be determined based on a more specific topic level instead of the more general category level. Other variations are possible.

Figure 2:
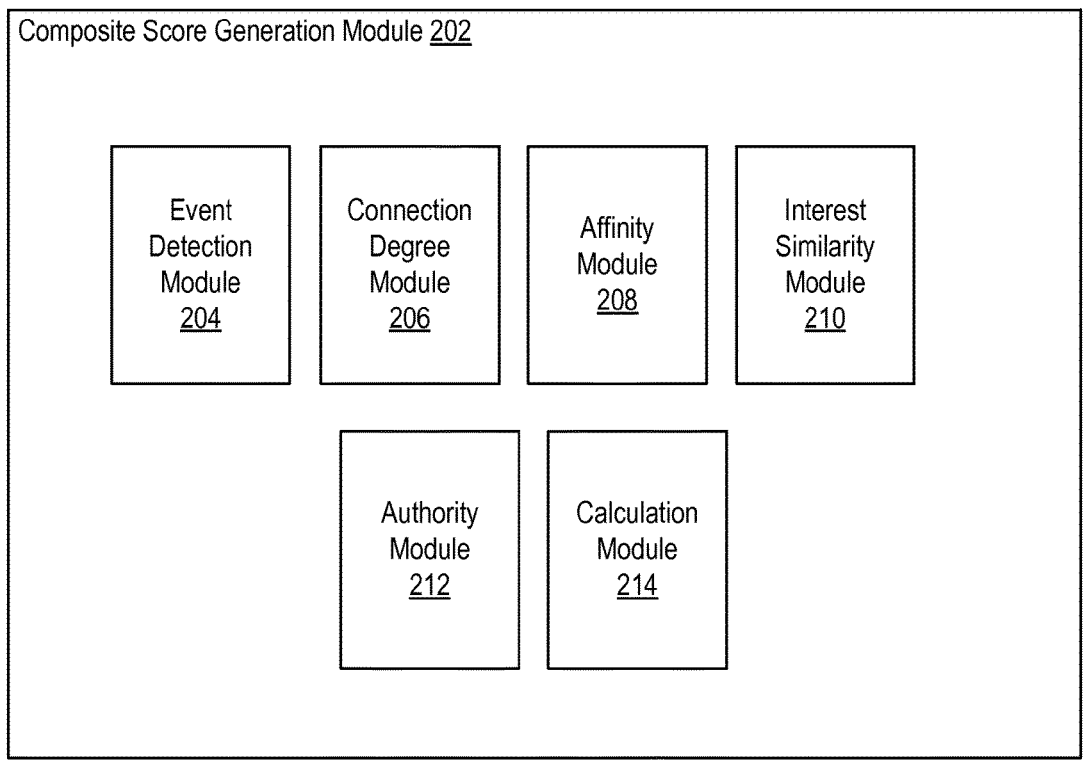
FIG. 2 illustrates a composite score generation module, according to an embodiment of the present disclosure.

FIG. 2 illustrates an example composite score generation module 202 configured to determine composite scores for topics, according to an embodiment of the present disclosure. In some embodiments, the composite score generation module 104 of FIG. 1 can be implemented with the composite score generation module 202. The composite score generation module 202 can generate a composite score for each topic that occurs within a relevant scope of a social network of a user.

The relevant scope of the social network of the user can be specified by one or more of a variety of constraints. For example, the relevant scope can be based on a threshold value of a number of degrees of separation between the user and connections of the user. The relevant scope can include the connections that fall within the threshold value of the number of degrees of separation. In some instances, the threshold value of the number of degrees of separation can be one, two, three, or any other suitable value. As another example, the relevant scope can be additionally or alternatively specified by a threshold value of a number of most recent interactions of connections on the social networking system from which topics can be determined. The threshold value of the number of interactions can be any suitable value, such as 10, 25, 50, or any other desired value. As yet another example, the relevant scope can be additionally or alternatively specified by a threshold value of a historical time period over which to determine topics in which the connections have expressed interest. For example, the threshold value of the historical time period can be one week, 24 hours, 12 hours, one hour, 30 minutes, or any other suitable historical time period. The composite score generation module 202 can be based on one or more of the constraints, such as the threshold value of a number of degrees of separation between the user and connections of the user, the threshold value of a number of interactions of connections from which topics can be determined, and the threshold value of a historical time period over which to consider the interactions.

As shown in the example of FIG. 2, the composite score generation module 202 can include an event detection module 204, a connection degree module 206, an affinity module 208, an interest similarity module 210, an authority module 212, and a calculation module 214.

The event detection module 204 can detect interactions by connections of the user on the social networking system. The event detection module 204 can identify interactions by the connections that reflect their interest in topics. The interactions can include postings by the connections of associated content that include an image, text, or other data. The event detection module 204 can provide information about the interactions to another module of the social networking system that can discern or otherwise identify topics from the associated content. A topic identified from an interaction and the connection associated with the interaction can be provided to other modules of the composite score generation module 202 as discussed herein.

The connection degree module 206 can determine a degree of separation (connection) between the user and a connection associated with an interaction from which a topic has been identified. The connection degree module 206 can perform a search of a social graph of the user to determine the degree of separation with the connection. The degree of separation between the user and a connection can be determined for every connection associated with an interaction from which a topic has been identified. The degree of separation can be expressed as any suitable numerical value. For example, a degree of separation of one can be expressed as a value of one, a degree of separation of two can be expressed as a value of one-half, and so on.

The affinity module 208 can determine a value of affinity between the user and each connection associated with an interaction from which a topic has been identified. Affinity between two entities can be a quantitative measure of the relatedness between two entities. Various factors can inform the determination of affinity. Such factors can include but are not limited to, for example, responsiveness of the two entities to postings by one another; the number, type, or frequency of communications between the two entities; whether the two entities are related as family; whether the two entities share a demographic profile; the extent to which the two entities have common connections; whether the two entities have common backgrounds (e.g., same schools, same company employment, same religious beliefs or activities, etc.); etc. The affinity value between a user and a connection can be determined based on the social graph of the user. In some embodiments, the affinity value can be periodically calculated and maintained by the social networking system.

The interest similarity module 210 can determine a value of interest similarity between the user and each connection associated with an interaction from which a topic has been identified. A value of interest similarity can be determined for each topic. The interest similarity module 210 can determine a topic based on the detection of an interaction of a connection from which a topic can be identified. The determined topic (e.g., world series winning Giants) can be associated with a category (e.g., sports). A weight reflecting a value of interest similarity can be identified between the user and the connection based on similarity of recently interacted topics and categories at different levels of granularity (or the category to which the topic belongs). In some embodiments, the weight reflecting the value of interest similarity can be periodically calculated and maintained by the social networking system. The interest similarity module 210 is discussed in more detail herein.

The authority module 212 can determine a value of authority relating to each connection associated with an interaction from which a topic has been identified. The value of authority for a connection can reflect a level of skill, experience, credibility, trustworthiness, or other indicia of expertise of the connection with respect to the topic. The value of authority can be based on one or more of, for example, interactions of the connection that demonstrate expertise of the connection in relation to the topic, assessments by others regarding the expertise of the connection, an assessment by the connection regarding her expertise in relation to the topic, a profile of the connection demonstrating or suggesting expertise in relation to the topic, etc. In some embodiments, the value of authority relating to each connection for each topic can be periodically calculated and maintained by the social networking system.

The calculation module 214 can calculate a composite score for each topic. The composite score can account for one or a plurality of connections of a user who have expressed interest in a topic. The composite score further can account for one connection of a user who has expressed multiple instances of interest in a topic. Each expression of interest in a topic can correspond to a separate interaction by a connection from which a topic can be identified.

The calculation module 214 can calculate a term for every instance of interest in a topic. The instances of interest in a topic can be associated with one or a plurality of connections. The term can be the product of the degree of separation between the user and a connection associated with an interaction from which the topic has been identified, a value of affinity between the user and the connection, and a weight reflecting a value of interest similarity between the user and the connection based on similarity of recently interacted topics and categories at different levels of granularity (or a category to which the topic belongs). For example, for each topic, a product can be calculated for every instance of interest in a topic as expressed by one or more connections. When a particular connection is associated with more than one instance of interest in a topic, the product can be calculated once and then multiplied by the number of instance of interest in the topic. In some embodiments, to optimize the timeliness of trending topics potentially presented to the user, the calculation module 214 can apply a time decay factor to the product to increase the relative value of topics that are more recent or decrease the relative value of topics that are less recent. The calculation module 214 can combine all of the products for a topic to produce a composite score for the topic. In this regard, products for all instances of interest in a topic as expressed by a plurality of connections can be aggregated to produce a composite score in relation to the topic. For example, the products for a topic can be summed together to produce a composite score for the topic. The calculation module 214 can produce a composite score for each identified topic.

Figure 3:
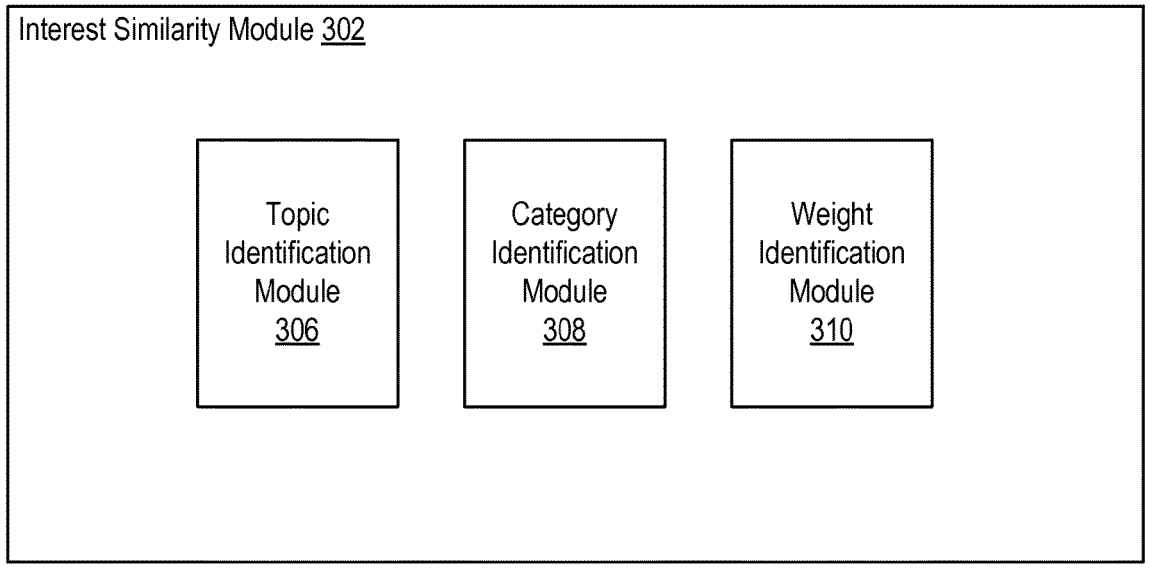
FIG. 3 illustrates an example interest similarity module, according to an embodiment of the present disclosure.

FIG. 3 illustrates an example interest similarity module 302, according to an embodiment of the present disclosure. In some embodiments, the interest similarity module 210 can be implemented by the interest similarity module 302. The interest similarity module 302 can include a topic identification module 306, a category identification module 308, and a weight identification module 310.

The topic identification module 306 is configured to determine topics from interactions of connections of the user with the social networking system. The interactions can include postings of content by a connection. A posting can include an image, text, or other data. The topic identification module 306 can analyze the content to predict topics reflected in the content. For example, when the content includes text, one or more natural language processing techniques can be used to identify topics from the text. As another example, when the content includes an image, object recognition and image analysis techniques can be used to identify topics reflected in the image. Other techniques to determine topics from interactions are possible.

The category identification module 308 can identify a category associated with an identified topic. Categories can be specified in a manner that covers all potential topics in which users of the social networking system can express interest. The categories may be specified in whole or in part by the social networking system or a third party source. The categories can be organized into hierarchical levels of varying levels of specificity. Each category can be specified to cover or include one or more topics. In some embodiments, a topic can be assigned to only one category.

The weight identification module 310 can identify a weight reflecting a value of interest similarity between the user and the connection for a category to which a topic belongs. The weight can represent the degree to which the user and the connection have common interest or enthusiasm for a category. In some embodiments, the weight can be based on a vector of values that represent actions reflecting interest of the user in a category and a vector of values that represent actions reflecting interest of a connection of the user in the category. Such actions could include, for example, the number of times that pages associated with the category have been liked, the number of times postings have been made relating to the category, the number of communications with others having relatively high authority with respect to the category, etc. In some embodiments, a value of interest similarity for the user and the connection with respect to the topic can be computed by a cosine similarity technique.

Figure 4:
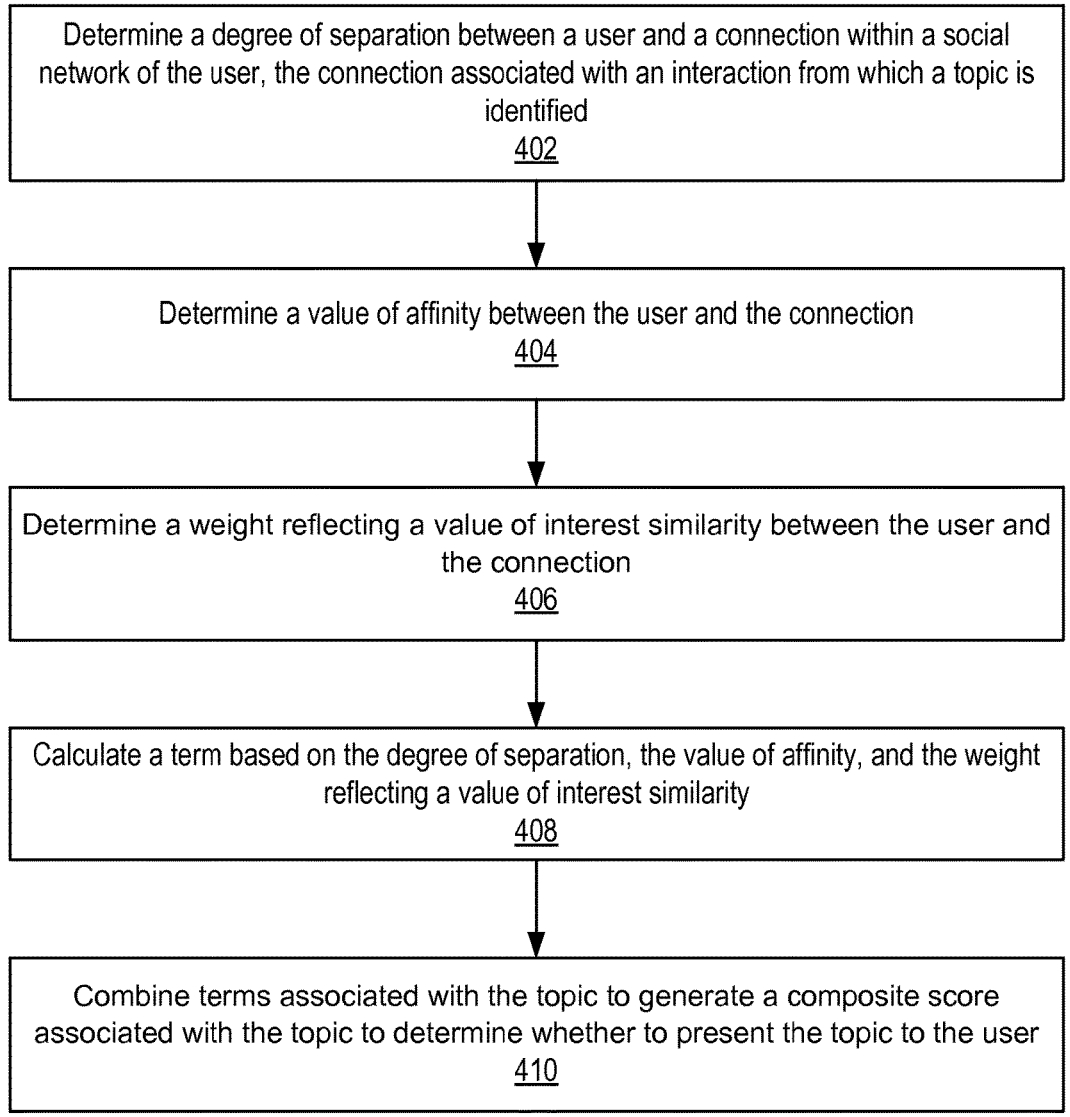
FIG. 4 illustrates an example method to determine a composite score, according to an embodiment of the present disclosure.

FIG. 4 illustrates an example method 400 to determine a composite score, according to an embodiment of the present disclosure. It should be appreciated that there can be additional, fewer, or alternative steps performed in similar or alternative orders, or in parallel, within the scope of the various embodiments unless otherwise stated.

At block 402, the method 400 can determine a degree of separation between a user and a connection within a social network of the user, the connection associated with an interaction from which a topic is identified. At block 404, the method 400 can determine a value of affinity between the user and the connection. At block 406, the method 400 can determine a weight reflecting a value of interest similarity between the user and the connection. At block 408, the method 400 can calculate a term based on the degree of separation, the value of affinity, and the weight reflecting a value of interest similarity. At block 410, the method 400 can combine terms associated with the topic to generate a composite score associated with the topic to determine whether to present the topic to the user. In this regard, as discussed herein, products for all instances of interest in a topic as expressed by a plurality of connections can be aggregated to produce the composite score. Other suitable techniques are possible.

Figure 5A:
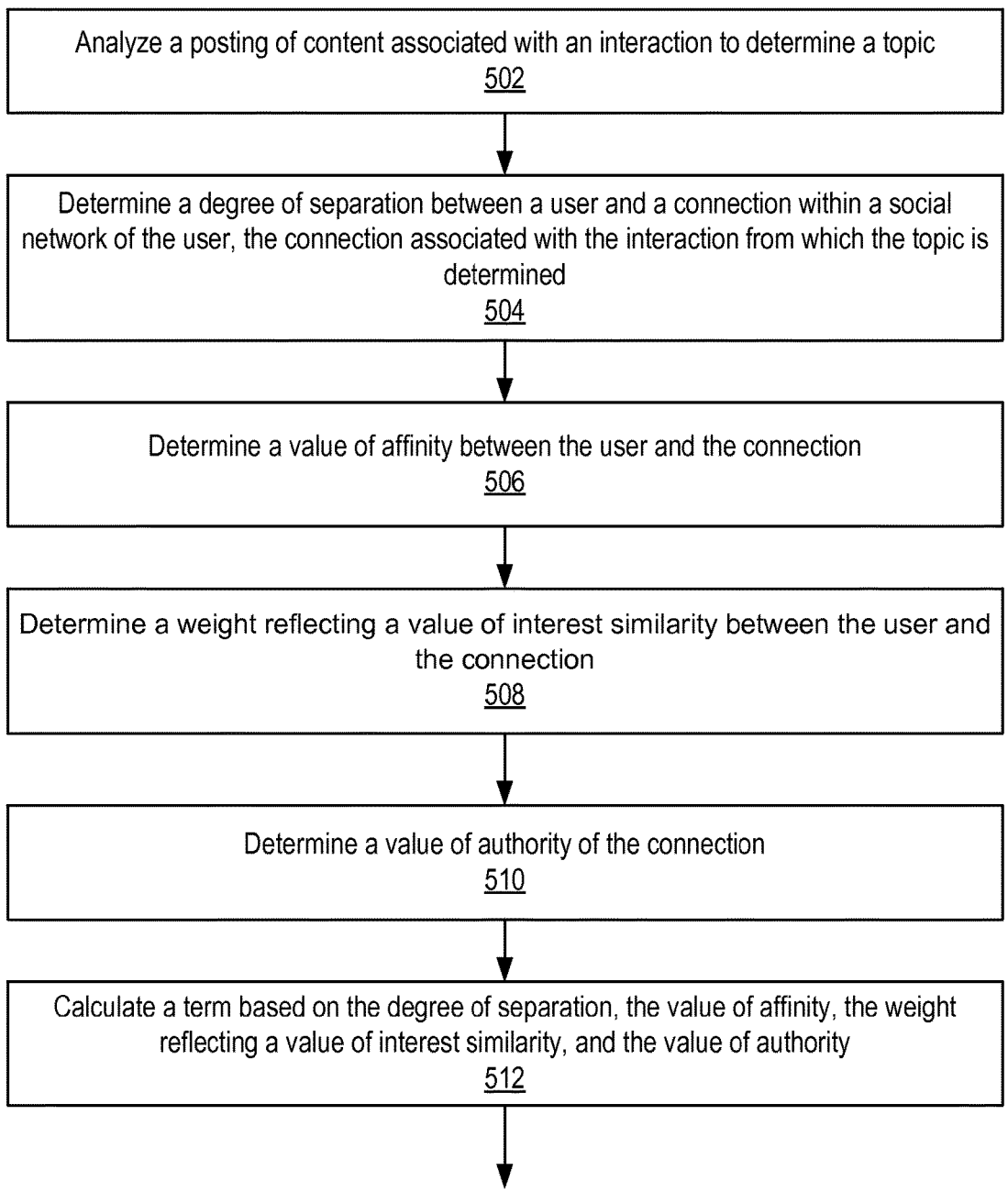
FIGS. 5A-5B illustrate an example method for providing topics for presentation to a user, according to an embodiment of the present disclosure.
Figure 5B:
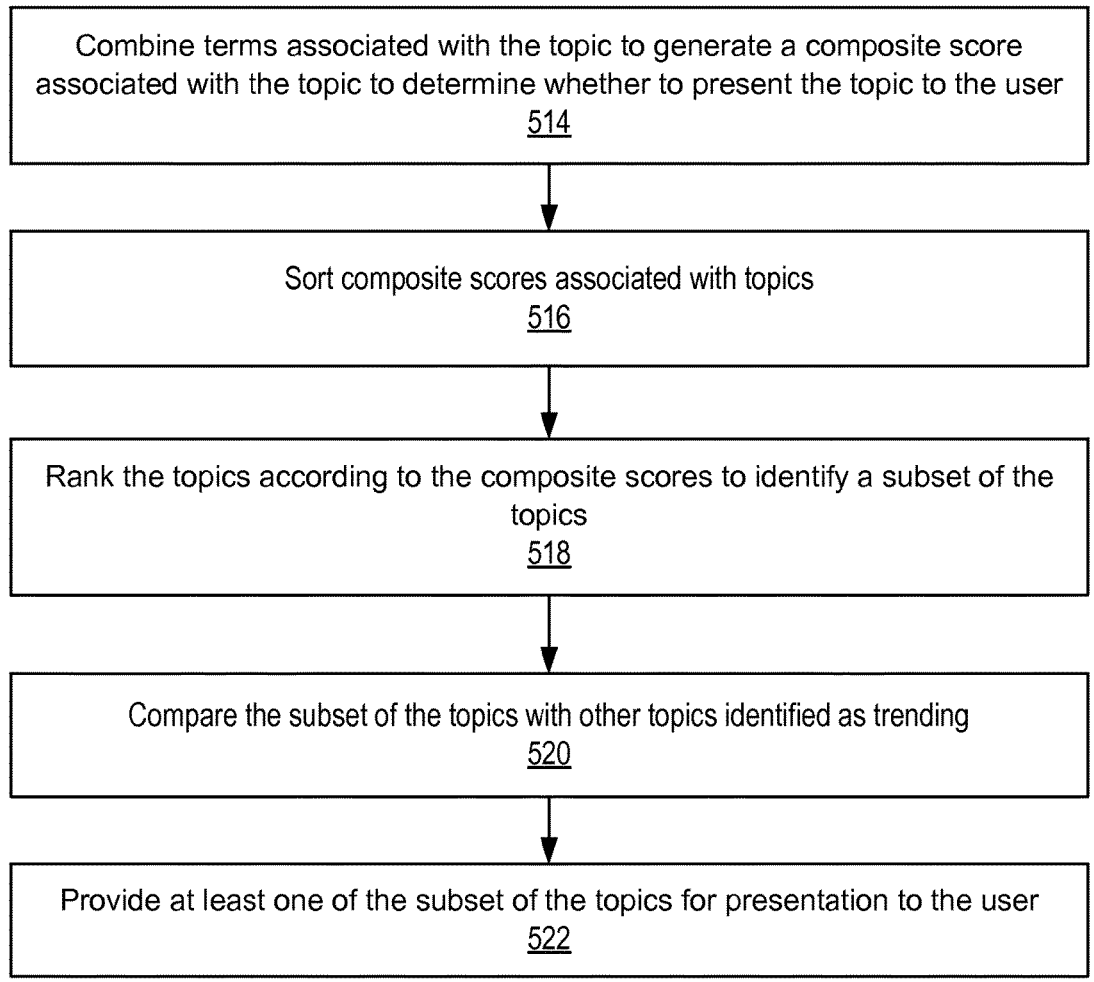

FIGS. 5A-5B illustrate an example method 500 to provide topics for presentation for a user, according to an embodiment of the present disclosure. It should be appreciated that there can be additional, fewer, or alternative steps performed in similar or alternative orders, or in parallel, within the scope of the various embodiments unless otherwise stated.

At block 502, the method 500 can analyze a posting of content associated with an interaction to determine a topic. At block 504, the method 500 can determine a degree of separation between a user and a connection within a social network of the user, the connection associated with an interaction from which a topic is identified. At block 506, the method 500 can determine a value of affinity between the user and the connection. At block 508, the method 500 can determine a weight reflecting a value of interest similarity between the user and the connection. At block 510, the method 500 can determine a value of authority of the connection. At block 512, the method 500 can calculate a term based on the degree of separation, the value of affinity, and the weight reflecting a value of interest similarity. At block 514, the method 500 can combine terms associated with the topic to generate a composite score associated with the topic to determine whether to present the topic to the user. In this regard, as discussed herein, products for all instances of interest in a topic as expressed by a plurality of connections can be aggregated to produce the composite score. At block 516, the method 500 can sort composite scores associated with topics. At block 518, the method 500 can rank the topics according to the composite scores to identify a cluster of the topics. At block 520, the method 500 can compare the cluster of the topics with other topics identified as trending. At block 522, the method 500 can provide at least one of the cluster of the topics for presentation to the user. Other suitable techniques are possible.

Social Networking System—Example Implementation

Figure 6:
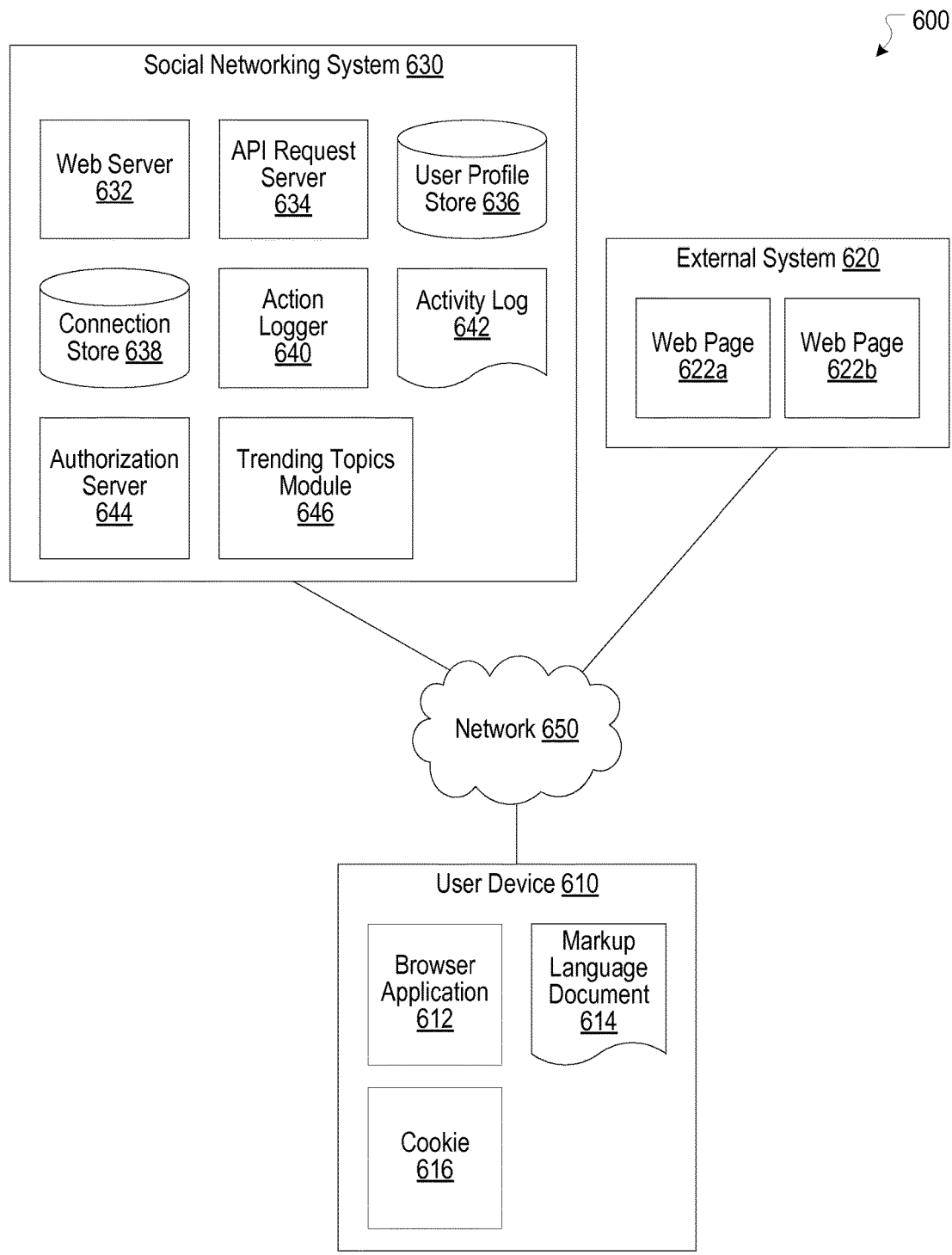
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a trending topics module 646. The trending topics module 646 can be implemented with the trending topics module 102.

Hardware Implementation

Figure 7:
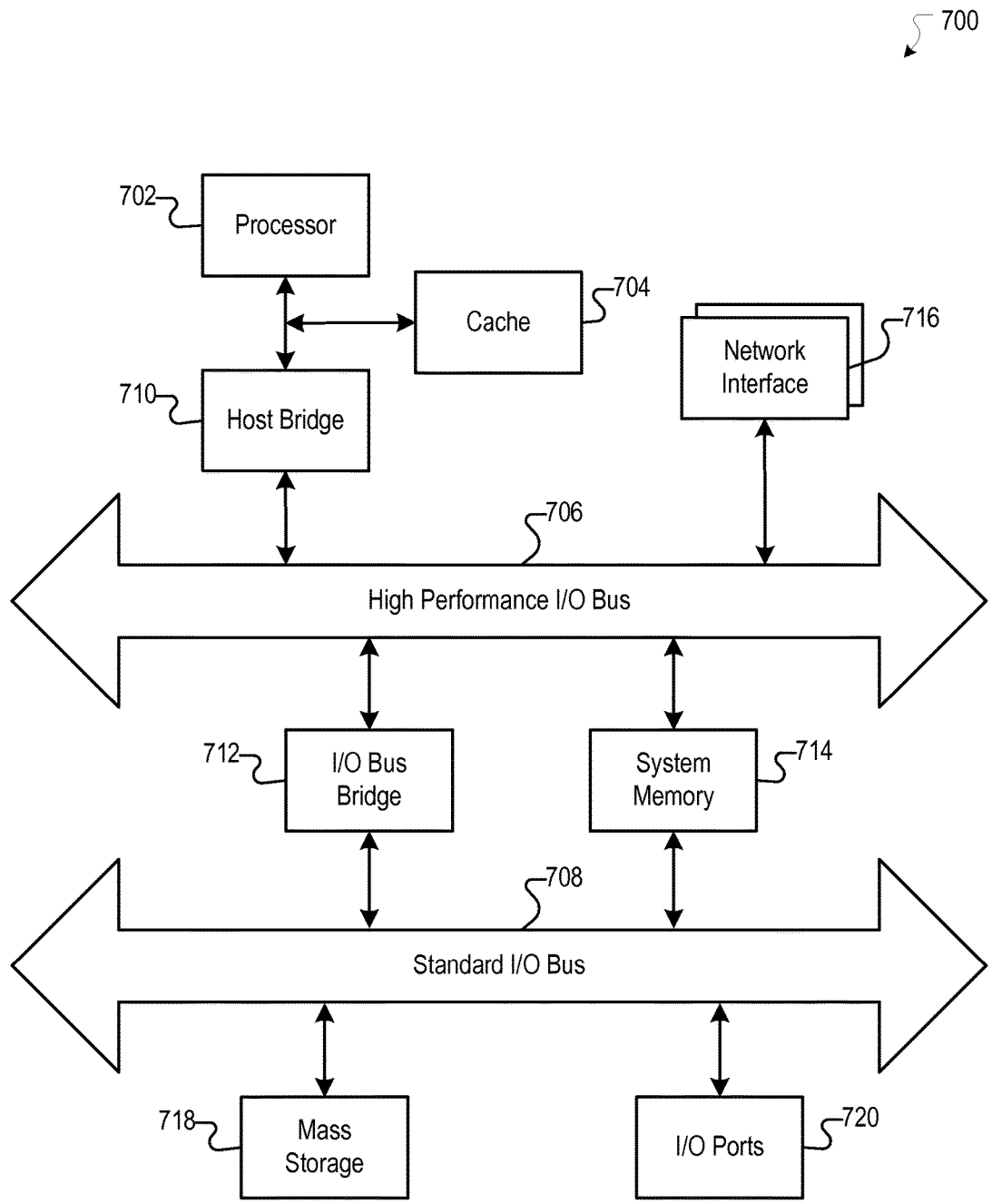
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, at least one topic for potential presentation to a user based on an interaction of a connection of the user on a social networking system;
   determining, by the computing system, a degree of separation between the user and the connection within the social networking system;
   determining, by the computing system, a value of affinity between the user and the connection;
   determining, by the computing system, a weight reflecting a value of interest similarity between the user and the connection;
   calculating, by the computing system, a term based on the degree of separation, the value of affinity, and the weight reflecting a value of interest similarity; and
   combining, by the computing system, terms associated with the at least one topic to generate a composite score associated with the at least one topic to determine whether to present the at least one topic to the user.

2. The computer-implemented method of claim 1, further comprising:
   determining a value of authority of the connection, wherein the term is further based on the value of authority.

3. The computer-implemented method of claim 1, wherein the weight reflecting a value of interest similarity between the user and the connection is based on similarity of recently interacted topics and categories at different levels of granularity.

4. The computer-implemented method of claim 1, further comprising:

analyzing a posting of content associated with the interaction to determine the at least one topic.

5. The computer-implemented method of claim 1, wherein the connection is within a threshold value of a number of degrees of separation from the user.

6. The computer-implemented method of claim 1, wherein the interaction is within a threshold value of a number of interactions of connections from which topics can be determined.

7. The computer-implemented method of claim 1, wherein a time associated with the interaction is within a threshold value of a historical time period over which to determine topics.

8. The computer-implemented method of claim 1, further comprising:
sorting composite scores associated with topics; and
ranking the topics according to the composite scores to identify a cluster of the topics.

9. The computer-implemented method of claim 8, further comprising:
comparing the cluster of the topics with other topics identified as trending.

10. The computer-implemented method of claim 9, further comprising:
providing at least one of the cluster of the topics for presentation to the user.

11. A system comprising:
at least one processor; and
a memory storing instructions that, when executed by the at least one processor, cause the system to perform:
determining at least one topic for potential presentation to a user based on an interaction of a connection of the user on a social networking system;
determining a degree of separation between the user and the connection within the social networking system;
determining a value of affinity between the user and the connection;
determining a weight reflecting a value of interest similarity between the user and the connection;
calculating a term based on the degree of separation, the value of affinity, and the weight reflecting a value of interest similarity; and
combining terms associated with the at least one topic to generate a composite score associated with the at least one topic to determine whether to present the at least one topic to the user.

12. The system of claim 11, further comprising:
determining a value of authority of the connection, wherein the term is further based on the value of authority.

13. The system of claim 11, wherein the weight reflecting a value of interest similarity between the user and the connection is based on similarity of recently interacted topics and categories at different levels of granularity.

14. The system of claim 11, further comprising:
analyzing a posting of content associated with the interaction to determine the at least one topic.

15. The system of claim 11, wherein the connection is within a threshold value of a number of degrees of separation from the user.

16. A non-transitory computer-readable storage medium including instructions that, when executed by at least one processor of a computing system, cause the computing system to perform a method comprising:
determining at least one topic for potential presentation to a user based on an interaction of a connection of the user on a social networking system;
determining a degree of separation between the user and the connection within the social networking system;
determining a value of affinity between the user and the connection;
determining a weight reflecting a value of interest similarity between the user and the connection;
calculating a term based on the degree of separation, the value of affinity, and the weight reflecting a value of interest similarity; and
combining terms associated with the at least one topic to generate a composite score associated with the at least one topic to determine whether to present the at least one topic to the user.

17. The non-transitory computer-readable storage medium of claim 16, further comprising:
determining a value of authority of the connection, wherein the term is further based on the value of authority.

18. The non-transitory computer-readable storage medium of claim 16, wherein the weight reflecting a value of interest similarity between the user and the connection is based on similarity of recently interacted topics and categories at different levels of granularity.

19. The non-transitory computer-readable storage medium of claim 16, further comprising:
analyzing a posting of content associated with the interaction to determine the at least one topic.

20. The non-transitory computer-readable storage medium of claim 16, wherein the connection is within a threshold value of a number of degrees of separation from the user.

* * * * *